(12) United States Patent
Ratasuk et al.

(10) Patent No.: US 9,042,280 B2
(45) Date of Patent: May 26, 2015

(54) METHODS AND APPARATUS FOR HALF DUPLEX SCHEDULING

(75) Inventors: Rapeepat Ratasuk, Hoffman Estates, IL (US); Gerald Gutowski, Glenview, IL (US); Weidong Yang, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 41 days.

(21) Appl. No.: 13/547,149

(22) Filed: Jul. 12, 2012

(65) Prior Publication Data

US 2014/0016526 A1    Jan. 16, 2014

(51) Int. Cl.
*H04L 5/16* (2006.01)
*H04W 72/12* (2009.01)

(52) U.S. Cl.
CPC .................. *H04W 72/1205* (2013.01)

(58) Field of Classification Search
None
See application file for complete search history.

(56) References Cited

U.S. PATENT DOCUMENTS

| | | | |
|---|---|---|---|
| 5,966,378 A * | 10/1999 | Hamalainen | 370/348 |
| 2009/0213765 A1 | 8/2009 | Rinne et al. | |
| 2009/0296609 A1 | 12/2009 | Choi et al. | |
| 2010/0085901 A1 | 4/2010 | Womack et al. | |
| 2010/0195546 A1 | 8/2010 | Chun et al. | |
| 2011/0007699 A1 | 1/2011 | Moon et al. | |
| 2012/0263120 A1 * | 10/2012 | Gopalakrishnan et al. | 370/329 |
| 2013/0250772 A1 * | 9/2013 | Yin | 370/241 |

OTHER PUBLICATIONS

Parallel Operation of Half- and Full-Duplex FDD in Future Multi-Hop Mobile Radio Networks, Otyakmaz et al., Wireless Conference, 2088, IEEE, pp. 1990-1994, May 2008.*
"Matrix of Potential MTC LTE UE Cost Reductions", IPWireless Inc., 3GPP TSG RAN WG1 Meeting #68bis, R1-120964, Mar. 2012, 7 pgs.
"Discussion on cost saving identified for low-cost MTC LTE UEs", MStar Semiconductor, Inc., 3GPP TSG RAN WG1 #69, R1-122755, May 2012, 5 pgs.
"Parallel Operation of Half- and Full-Duplex FDD in Future Multi-Hop Mobile Radio Networks", Arif Otyakmaz, et al., Wireless Conference, 2008 EW 2008, 14$^{th}$ European, pp. 1-7, 22-25, Jun. 2008.
"An FDD Multihop Cellular Network for 3GPP-LTE", Rainer Schoenen, et al., Vehicular Technology Conference, 2008, VTC Spring 2008, IEEE, pp. 1990-1994, May 2008.
Ericsson et al.; "Half Duplex FDD in LTE"; TSG-RAN WG1 #51bis; R1-080534; Sevilla, Spain, Jan. 14-18, 2008; whole document (4 pages).

* cited by examiner

*Primary Examiner* — Huy D Vu
*Assistant Examiner* — Teisha D Hall
(74) *Attorney, Agent, or Firm* — Harrington & Smith

(57) ABSTRACT

Systems and techniques are described for scheduling communication by half-duplex devices. One or more half-duplex devices informs a base station that it is capable only of half-duplex operation. For each such device, the base station configures a transmit/receive pattern comprising sequences of uplink and downlink subframes and applies the pattern to the device. The half-duplex device may receive during a downlink subframe and may transmit during an uplink subframe. Uplink and downlink subframes within a pattern are separated by an offset based at least in part on a number of hybrid automatic repeat request processes.

21 Claims, 4 Drawing Sheets

METHODS AND APPARATUS FOR HALF DUPLEX SCHEDULING

TECHNICAL FIELD

The present invention relates generally to telecommunications. More particularly, the invention relates to systems and techniques for scheduling of half duplex communication.

BACKGROUND

Modern cellular communication systems, such as third generation partnership project (3GPP), 3GPP long term evolution (3GPP LTE) and 3GPP LTE-advanced (3GPP LTE-A) are in large part directed to the use of full duplex communication, because many devices supported by such networks impose significant demands on the available frequencies. However, increasing numbers of devices are designed for and deployed in uses in which half duplex frequency division duplex (FDD) can be used, and can be advantageous because half duplex FDD can be achieved a lower cost than can full duplex FDD. One application in particular that can be supported by half duplex FDD is machine type communications (MTC) because MTC devices often engage in infrequent, short duration communication that can be easily accommodated by half duplex FDD. In 3GPP LTE, half duplex operation is a supported mode, but not mandatory, so that numerous eNodeBs (eNBs) may exist into which half-duplex FDD has not been implemented, and the use of half-duplex devices in systems designed to support only full-duplex can add significant implementation complexity.

For a half-duplex FDD device, the device may continuously listen to the downlink channels except when instructed by the network to transmit on the uplink. Uplink transmissions may be based on higher-layer configuration, for example, Channel Quality Information, in response to downlink transmission, for example, acknowledgements or ACK/NACK, or scheduled, for example, data transmission. In this case, the scheduler must ensure that there are no scheduling conflicts for half-duplex FDD devices. Ensuring that there are no scheduling conflicts will require the scheduler to consider data and control traffic in both directions when making scheduling decisions. For example, the downlink scheduler must know of current uplink transmission. Likewise, the uplink scheduler must be aware of upcoming downlink ACK/NACK or semi-persistently scheduled transmission. Such operations significantly add to scheduler complexity. In addition, for a full-duplex FDD device, such scheduling restrictions are not needed, and this difference between half-duplex and full-duplex devices can make concurrent support more complicated.

SUMMARY

In one embodiment of the invention, a method comprises defining at least one transmit/receive pattern, wherein the at least one transmit pattern comprises at least one uplink subframe eligible for uplink transmission by at least one half-duplex capable device and at least one downlink subframe eligible for transmission to the at least one half-duplex capable device, wherein the first subframe of the at least one uplink subframe and the first subframe of the at least one downlink subframe are separated by a predefined timing offset. The method further comprises applying the transmit/receive pattern to at least one half-duplex capable device and scheduling at least one of transmission and receiving by the at least one half-duplex device based on the transmit/receive pattern.

In another embodiment of the invention, a method comprises configuring a message for transmission to a base station identifying a device as capable of only half-duplex frequency division duplex operation and receiving at least one downlink subframe eligible to be received by the device, wherein the at least one downlink subframe belongs to a transmit/receive pattern comprising the at least one downlink subframe and at least one uplink subframe, wherein the first subframe of the at least one downlink subframe is separated from the first subframe of the at least one uplink subframe by a predetermined timing offset.

In another embodiment of the invention, an apparatus comprises at least one processor and memory storing computer program code. The computer program code is configured to, with the memory and the at least one processor, cause the apparatus to at least define at least one transmit/receive pattern, wherein the at least one transmit pattern comprises at least one uplink subframe eligible for uplink transmission by at least one half-duplex capable device and at least one downlink subframe eligible for transmission to the at least one half-duplex capable device, wherein the first subframe of the at least one uplink subframe and the first subframe of the at least one downlink subframe are separated by an offset based on a predefined timing offset. The apparatus is further configured to apply the transmit/receive pattern to at least one half-duplex capable device and schedule at least one of transmission and receiving by the at least one half-duplex device based on the transmit/receive pattern.

In another embodiment of the invention, an apparatus comprises at least one processor and memory storing computer program code. The computer program code is configured to, with the memory and the at least one processor, cause the apparatus to at least configure a message for transmission to a base station identifying a device as capable of only half-duplex frequency division duplex operation and receive at least one downlink subframe eligible to be received by the device, wherein the at least one downlink subframe belongs to a transmit/receive pattern comprising the at least one downlink subframe and at least one uplink subframe, wherein the first subframe of the at least one downlink subframe is separated from the first subframe of the at least one uplink subframe by a predetermined timing offset.

In another embodiment of the invention, a computer readable medium stores a program of instructions. Execution of the program of instructions by a processor configures an apparatus to at least define at least one transmit/receive pattern, wherein the at least one transmit pattern comprises at least one uplink subframe eligible for uplink transmission by at least one half-duplex capable device and at least one downlink subframe eligible for transmission to the at least one half-duplex capable device, wherein the first subframe of the at least one uplink subframe and the first subframe of the at least one downlink subframe are separated by a predefined timing offset. Execution of the program of instructions further configures the apparatus to apply the transmit/receive pattern to at least one half-duplex capable device and schedule at least one of communication to and communication from the at least one half-duplex device based on the transmit/receive pattern.

In another embodiment of the invention, a computer readable medium stores a program of instructions. Execution of the program of instructions by a processor configures an apparatus to at least configure a message for transmission to a base station identifying a device as capable of only half-duplex frequency division duplex operation and receive at least one downlink subframe eligible to be received by the device, wherein the at least one downlink subframe belongs to a transmit/receive pattern comprising the at least one downlink subframe and at least one uplink subframe, wherein the first subframe of the at least one downlink subframe is separated from the first subframe of the at least one uplink subframe by a predetermined timing offset.

DETAILED DESCRIPTION

Embodiments of the present invention recognize that a low-impact mechanism for implementing half-duplex FDD devices will ease the adoption of half-duplex in existing systems, which may already be supporting large numbers of full-duplex FDD devices.

Figure 1:
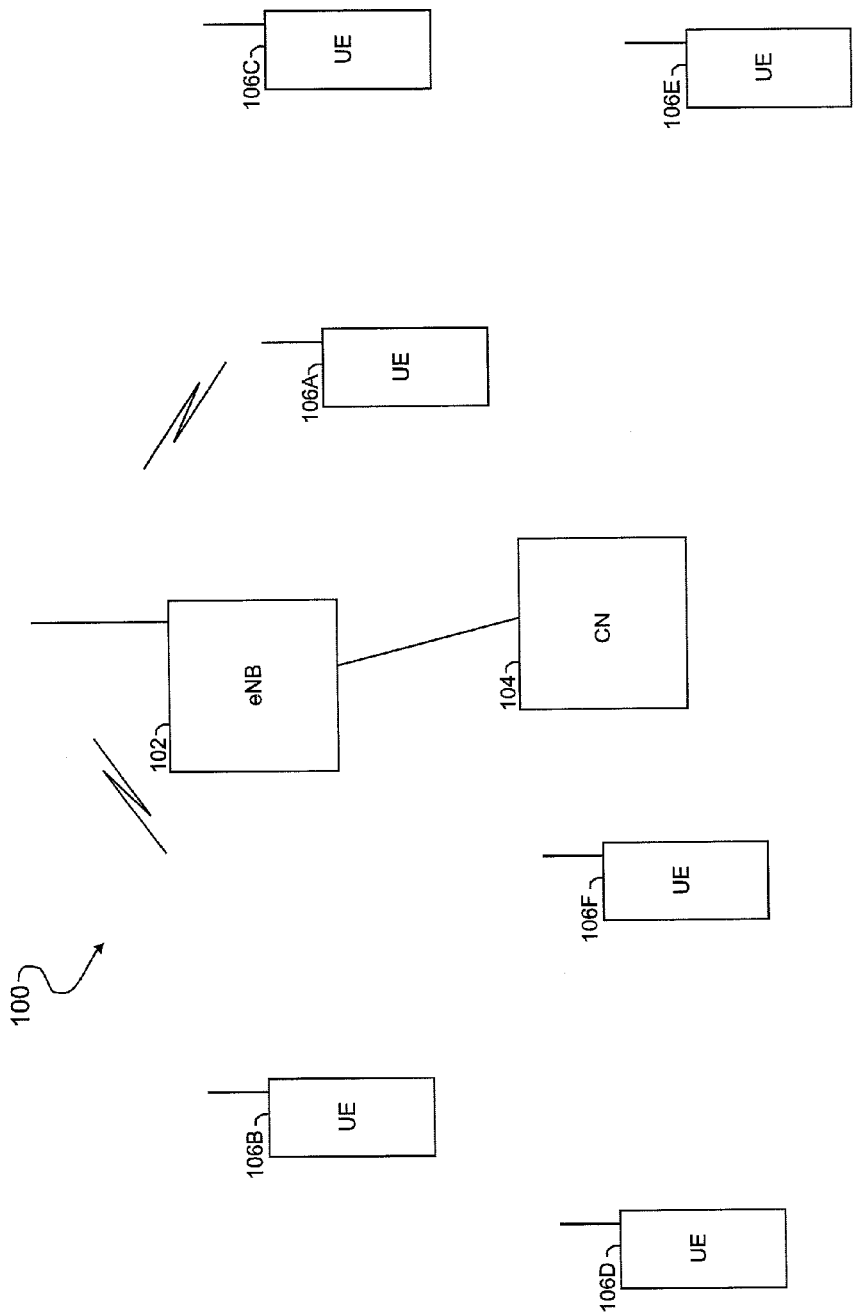
FIG. 1 illustrates a cellular network and multiple user devices according to one or more embodiments of the invention.

FIG. 1 illustrates a system 100 according to an embodiment of the present invention. The system 100 comprises a base station, which may suitably be implemented as an eNB 102, communicating with a core network 104 and supporting a number of user devices, also know as user equipments (UEs) 106A-106F, of which UEs 106A-106C are designed to operate in full-duplex mode and UEs 106D-106F are designed to be capable of operating only in half-duplex FDD mode.

In one or more embodiments of the invention, therefore, a UE, such as one or more of the UEs 106D-106F, capable of only half-division duplex FDD operation, may inform its supporting network of its capability during configuration. The configuration may be accomplished, for example, by communication between the eNB 102 and a UE. Communication may, for example, comprise radio resource control (RRC) configuration. Notification may be accomplished, for example, through a capability field in RRC or other appropriate signaling.

Upon receiving notification of the UE's half-duplex capability, the network 100, such as through the eNB 102, may apply a transmit/receive (Tx/Rx) eligibility pattern identifying the subframes during which the UE is allowed to transmit and the subframes during which the UE is allowed to receive. The pattern need be implemented only at the eNB and govern activity that can be controlled by the eNB on its own, in a manner transparent to the UEs. The use of such a pattern does not, require, for example, any changes to any of the UEs 106A-106C. In one or more embodiments of the invention, four downlink (DL) receive (Rx) subframe patterns are available as shown below:
Usable DL subframes:
$(10 \times n_f + n_s - N_{OFFSET}) \bmod(N_{HARQ}) = \{0\}, \{0,1\}, \{0,1,2\}, \{0,1,2,3\})$
where $n_f$ is the system subframe number, $n_s$ is the subframe number within a radio frame, $N_{OFFSET}$ is the starting subframe offset number, and $N_{HARQ}$ is the maximum number of HARQ processes. These values correspond to possible channel utilization of $\{1/8, 2/8, 3/8, 4/8\}$.

Once the downlink patterns are defined, the corresponding usable UL subframes can be determined as shown below:
Usable UL subframes:
$(10 \times n_f + n_s - N_{OFFSET} - N_{HARQ}/2) \bmod(N_{HARQ}) = \{0\}, \{0,1\}, \{0,1,2\}, \{0,1,2,3\})$ where the same set from the available sets is selected for both downlink and uplink.

Figure 2:
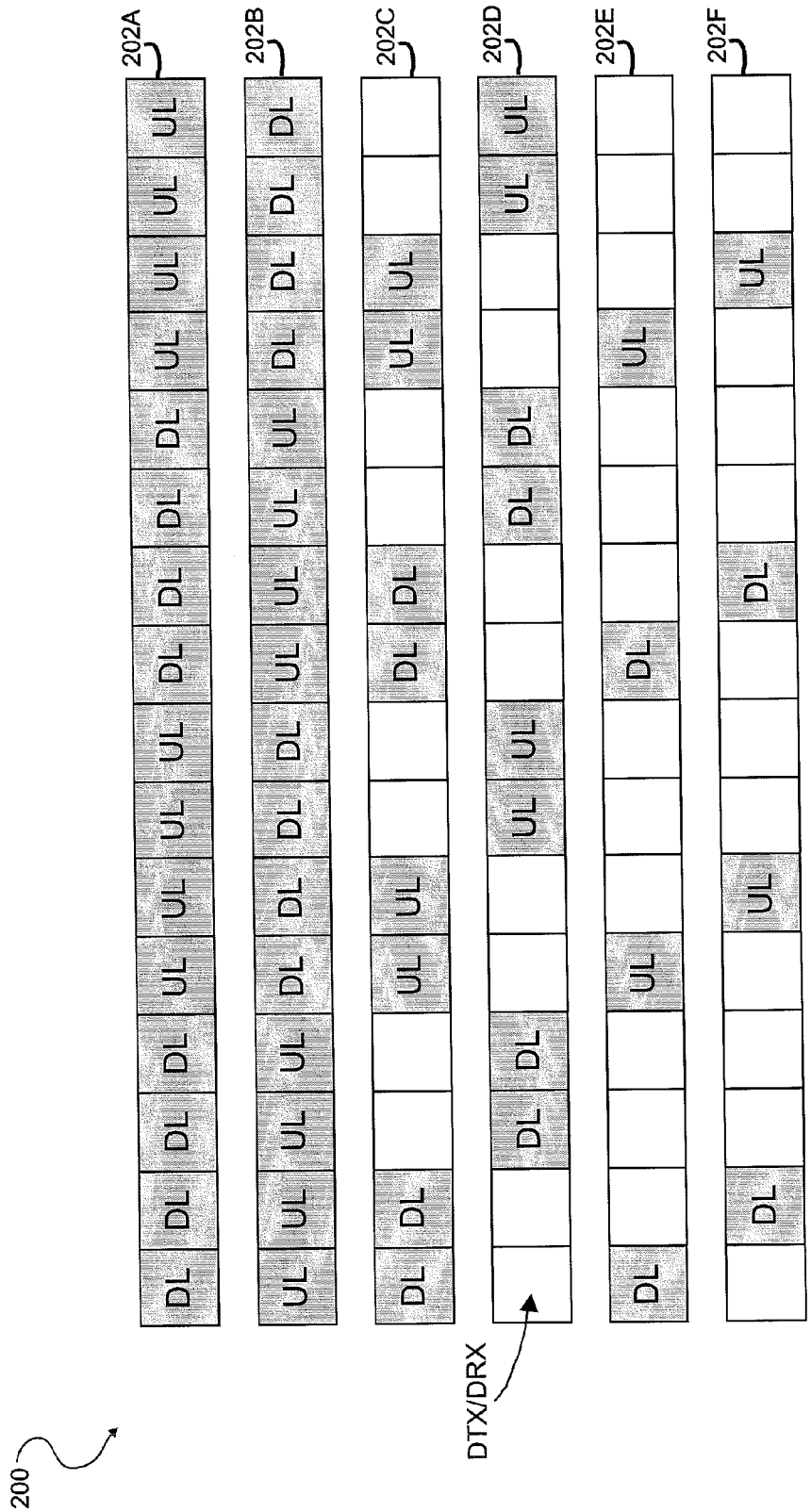
FIG. 2 illustrates exemplary communication traffic patterns according to an embodiment of the present invention.

FIG. 2 illustrates exemplary half-duplex FDD traffic patterns 202A-202F that may be configured and used according to one or more embodiments of the present invention. Different UEs may be associated with different patterns, and various exemplary patterns illustrated here may allow uplink or downlink transmission during only one subframe, separated by three subframes from another transmission-eligible subframe, as in patterns 202E-202F, during two adjacent subframes, with groups being separated from one another by two subframes, as in patterns 202C-202D, or during four adjacent subframes, as in patterns 202A-202B. A traffic pattern may be applied to a UE as needed depending on overall demands of UEs needing service from the eNB 102. Blank subframes in these patterns represent periods of discontinuous transmission or reception (DTx/DRx) when the UE assigned that pattern will not be sending or receiving data or acknowledgements.

Before scheduling, the eNB 102 uses the transmit pattern configured for a UE to perform eligibility checks to determine if the UE is eligible to transmit or receive in a particular subframe. Uplink feedback, such as CQI, PMI, RI, or SR can only be configured on transmit (Tx) eligible subframes. For UEs that are allowed to transmit or receive on four consecutive subframes, additional eligibility checks are needed. This is true because the UE requires a switching time between transmit and receive and therefore usually cannot support consecutive subframes in a different direction. A few exceptions can be made. For example, reception of PHICH in subframe n, and transmission with physical uplink shared channel/physical uplink shared control channel/physical random access channel (PUSCH/PUCCH/PRACH) in subframe n+1, is still feasible for a half-duplex UE. One exemplary set of checks is as follows:

For UEs that are allowed to transmit or receive on four consecutive subframes, a check is performed on the last DL subframe (subframe n) of the DL burst to determine if the UE has transmitted or received data in subframe n−3. If this is true, the eNB is not allowed to use that subframe for the UE. However, if a UE has an UL transmission on the last UL subframe of the burst, it may not be able to check physical downlink control channel (PDCCH) in subframe n+1. In this case, the UE may be configured to use shortened PUCCH in subframe n+1 or to drop the last symbol in the PUSCH, such as by configuring sounding reference signal (SRS) in the last symbol.

The eNB 102 performs load balancing between UEs, based, for example, on expected UE traffic, eNB utilization, network congestion, system information reception, and other relevant factors. As a starting point, the eNB 102 may, for example, assign to a UE a minimum number of subframes, and change this number based on UE traffic requirements.

The eNB 102 maintains a list of the number of UEs that are eligible for Rx, that is, assignment to a DL subframe in each subframe. The list is maintained modulo 8, which is the half-duplex period. Thus, eight counters {C0, C1, C2, C3, C4, C5, C6, C7} are maintained, one for each of the DL subframe. Each time a DL subframe has been associated to a UE as possible Rx subframe, the corresponding counter is incremented.

For example, suppose that the UE 106D has been assigned Rx subframes as follows:

UE 106D usable DL subframes:
$(10 \times n_f + n_s - N_{OFFSET}) \bmod (N_{HARQ}) = \{0,1,2,3\}$
Counters $\{C0, C1, C2, C3\}$ are incremented To take another example, suppose that the UE 106E has been assigned Rx subframes as follows:
UE 106E usable DL subframes:
$(10 \times n_f + n_s - N_{OFFSET}) \bmod (N_{HARQ}) = \{0,1\}$
Counters $\{C6, C7\}$ are incremented Once the number of subframes has been selected for a new UE, the eNB 102 selects the starting subframe offset, $N_{OFFSET}$, based on the computation $$N_{OFFSET} = \arg\min_j \left( \sum_{i=j}^{j+k-1} C_i, j = 0, \ldots, N_{HARQ} - k \right)$$

where k is the number of Rx subframes and $C_i$ is counter i—for example, C0.

If a UE is removed from the scheduling queue or reassigned to another eNB, such as through a handover, the counters are decremented.

The eNB 102 may also determine that certain subframes are preferred for assignment to half-duplex devices based on expected radio conditions of those subframes. For example, subframes experiencing high-interference, poor signal quality, or low spectral efficiency capability may be designated as preferred subframes for half-duplex devices. This is because half-duplex devices generally are not considered premium devices nor used for premium services and therefore can tolerate lower performance. Thus, they there can be assigned subframes with lower quality. For example, the eNB 102 may measure uplink interference over thermal noise (IoT) level of the system, and if the IoT level is above a certain threshold on specific periodic subframes, then those subframes can be first assigned to half duplex devices. Similarly, if the eNB 102 determines that particular downlink subframes can support lower data rates, for example, due to periodic interference from nearby eNBs as part of intercell interference coordination or due to heterogeneous network deployment, then these subframes can be first assigned to half duplex devices. Such determination can involve comparing a performance metric such as interference level, signal to noise ratio, or channel quality feedback to a threshold level.

Once a pattern has been established for a UE, the network 100 can adapt the pattern for the UE based on parameters that may include user uplink and downlink traffic, overall system traffic load, and other performance metrics for UEs such as the) UEs 106A-106F. One such performance metric may be latency. Some downlink subframes, such as the physical broadcast channel, must be able to be read by UEs receiving them. In such cases, a scheduling gap can be created for the UEs 106A-106F. Configuring the pattern to include a gap will be performed by the eNB 102 and will not require decisions by the UEs. The UEs will behave as directed by the eNB 102 and will not be required to make any decisions or take any actions based on the presence of the scheduling gap, beyond what is directed by the eNB 102.

Load balancing may be achieved, for example, through proportional fair metric adjustments to minimize impact to full-duplex UEs, such as the UEs 106A-106C. For example, the average throughput for a half-duplex UE may be adjusted based on the fraction of the subframes the UE is allowed to transmit. Quality of service class identifier (QCI) weighting may be adjusted to insure that low-cost MTC half-duplex devices do not preempt full-duplex devices. An adjustment such as the following may be made:

$$P_f(k) = W_{QCI} \frac{t_{instant}^\alpha}{t_{avg}\beta}$$

where $P_f(k)$ is the proportional far metric of user k, $W_{QCI}$ is the QCI weighting, $t_{instant}$ is the instantaneous achievable throughput, $t_{avg}$ is the average throughput, and $\alpha$ and $\beta$ are parameters used to adjust fairness.

An alternative approach to support half-duplex FDD is to assign each half-duplex UE a TDD UL/DL configuration as if it were a TDD UE. In this case, the half-duplex UE can follow TDD timing for control/data transmission and therefore there will be no potential scheduling conflicts. However, multiple UL/DL configurations must be simultaneously supported in order to efficiently utilize the FDD spectrum.

Figure 3:
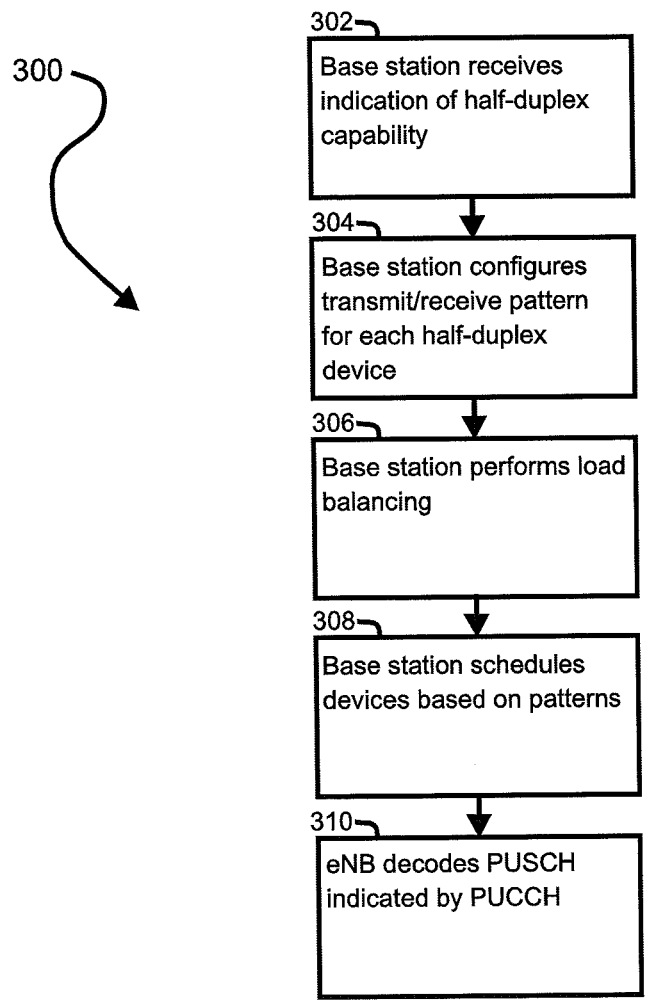
FIG. 3 illustrates a process according to an exemplary embodiment of the present invention.

FIG. 3 illustrates a process 300 according to an embodiment of the present invention. At step 302, a base station, such as an eNB, receives an indication from each of one or more devices, such as UEs, capable only of half-duplex operation that it is capable only of half-duplex operation. At step 304, the base station configures a pattern for each such device, specifying subframes during which the device is allowed to transmit and receive. At step 306, the base station performs load balancing between UEs, with load balancing taking into account the number of downlink subframes assigned to each UE, an offset based on a maximum number of HARQ processes, and proportional fair metric adjustments to minimize impacts to full-duplex UEs. Load balancing may be performed through Rx/Tx pattern adjustment, and such adjustment may be based on user traffic, system traffic load, and performance metrics of UEs. Pattern adjustment may also comprise the creation of scheduling gaps to allow reading of essential subframes, such as PBCH.

At step 308, the base station schedules UEs for communication using the patterns for half duplex communication and the load balancing.

One exemplary model for uplink spectral efficiency in a third generation preferred partnership long term evolution (3GPP LTE) case may comprise 57 cells, an inter-site distance of 500 meters, UEs spaced randomly within cells, using a full buffer traffic model and proportional fair scheduling. In such a model, sector spectral efficiency can be on the order of 0.76 for full duplex and 0.73 for half duplex, and cell edge spectral efficiency can be on the order of 0.015 for full duplex and also 0.015 for half duplex. An LTE system with half-duplex frequency division duplex UEs can provide performance similar to that of a system with full-duplex FDD UEs.

Figure 4:
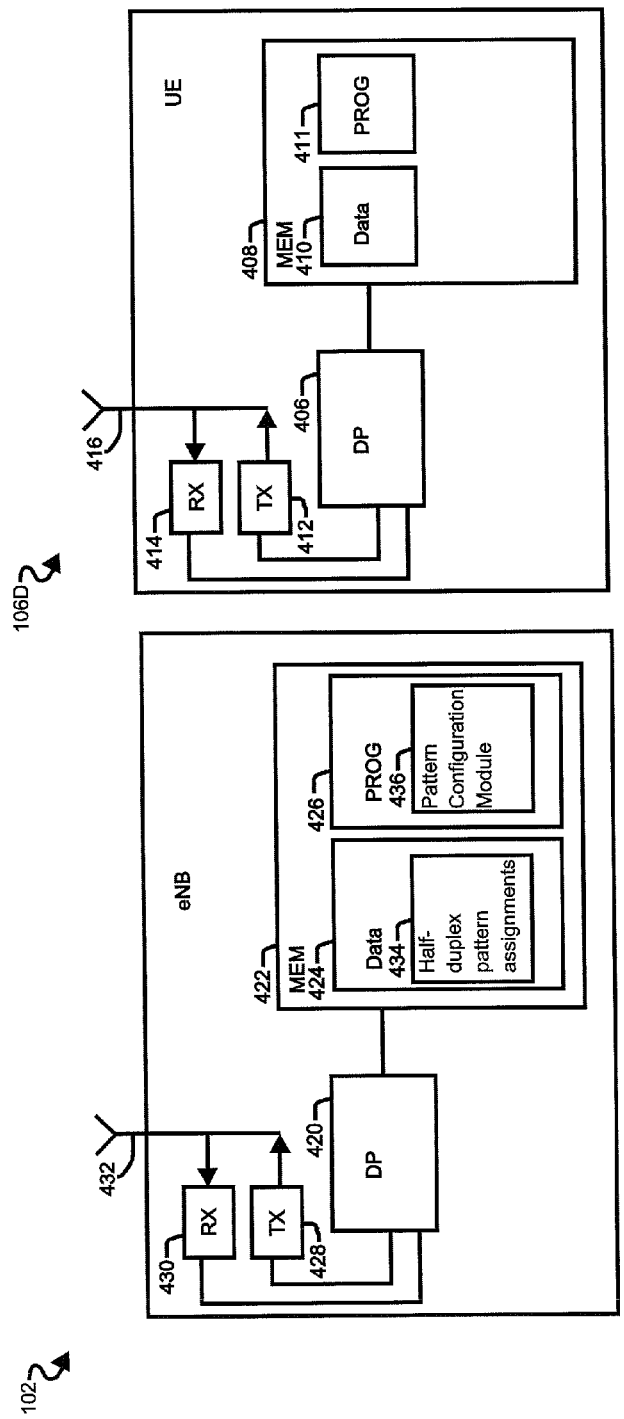
FIG. 4 illustrates block diagrams of the base station and one UE from FIG. 1 according to an exemplary embodiment of the present invention.

Reference is now made to FIG. 4 for illustrating a simplified block diagram of various electronic devices and apparatus that are suitable for use in practicing the exemplary embodiments of this invention. In FIG. 4 a eNB, such as the UE 102, is adapted for communication over a wireless link 404 with an apparatus, such as a mobile device/terminal such as the UE 106D. While there are typically a number UEs under control of an eNB such as the eNB 102, for simplicity only the UE 106D is shown at FIG. 4. The eNB 102 may be the base station 102 of FIG. 1 and the UE 106D may be one of the user devices 106A-106D of FIG. 1, with additional details of the eNB 102 and the UE 106D being illustrated here, with the understanding that the UEs 106A-106C, 106E, and 106F may also include elements similar to those illustrated in FIG. 4 and discussed here, with the further understanding that other devices suitable for carrying out one or more embodiments of the invention may include elements similar to those illustrated in FIG. 4 and discussed here, with appropriate modifications being made according to design choices. The eNB 102 may be any access node (including frequency selective repeaters) of any wireless network such as LTE, LTE-A, GSM, GERAN, WCDMA, and the like.

The UE 106D includes processing means such as at least one data processor (DP) 406, storing means such as at least one computer-readable memory (MEM) 408 storing data 410, at least one computer program (PROG) 411 or other set of executable instructions, communicating means such as a transmitter TX 412 and a receiver RX 414 for bidirectional wireless communications with the eNB 402 via one or more antennas 416.

The eNB 102 also includes processing means such as at least one data processor (DP) 420, storing means such as at least one computer-readable memory (MEM) 422 storing data 424 and at least one computer program (PROG) 426 or other set of executable instructions. The eNB 102 may also include communicating means such as a transmitter TX 428 and a receiver RX 430 for bidirectional wireless communications with the UE 405 (or UEs) via one or more antennas 432. Among the data 424 may be stored a repository 434 of half-duplex pattern associations, and among the PROGs 426 may be a pattern configuration module 436, performing functions such as processing information received from UEs, other network elements, and other information sources, configuring transmit/receive patterns, and creating pattern associations.

At least one of the PROGs 412 in the eNB 102 is assumed to include a set of program instructions that, when executed by the associated DP 420, enable the device to operate in accordance with the exemplary embodiments of this invention, as detailed above. The UE 106D also stores software 426 in its MEM 408 to implement certain aspects of these teachings. In these regards the exemplary embodiments of this invention may be implemented at least in part by computer software stored on the MEM 408 and 422, which is executable by the DP 406 of the UE 106D and/or by the DP 420 of the eNB 102, or by hardware, or by a combination of tangibly stored software and hardware (and tangibly stored firmware). Electronic devices implementing these aspects of the invention need not be the entire devices as depicted at FIG. 4 or may be one or more components of same such as the above described tangibly stored software, hardware, firmware and DP, or a system on a chip SOC or an application specific integrated circuit ASIC.

In general, the various embodiments of the UE 106D can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 408 and 422 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 406 and 420 include but are not limited to general purpose computers, special purpose computers, microprocessors, digital signal processors (DSPs) and multi-core processors.

While various exemplary embodiments have been described above it should be appreciated that the practice of the invention is not limited to the exemplary embodiments shown and discussed here. Various modifications and adaptations to the foregoing exemplary embodiments of this invention may become apparent to those skilled in the relevant arts in view of the foregoing description.

Further, some of the various features of the above non-limiting embodiments may be used to advantage without the corresponding use of other described features.

The foregoing description should therefore be considered as merely illustrative of the principles, teachings and exemplary embodiments of this invention, and not in limitation thereof.

We claim:

1. A method comprising: defining at least one transmit/receive pattern, wherein the at least one transmit/receive pattern comprises at least one uplink subframe eligible for uplink transmission by at least one half-duplex capable device and at least one downlink subframe eligible for transmission to the at least one half-duplex capable device, wherein for at least one transmit/receive pattern, the at least one uplink subframe comprises four consecutive uplink subframes and the at least one downlink subframe comprises four consecutive downlink subframes, and wherein, for a device to which the at least one transmit/receive pattern is applied, a check is performed on the last downlink subframe n of a downlink burst to determine if the device has transmitted or received data in subframe n−3 and, if so, the device is prevented from using subframe n−3, wherein the first subframe of the at least one uplink subframe and the first subframe of the at least one downlink subframe are separated only by a predefined timing offset, and wherein the predefined timing offset is based on the maximum number of hybrid automatic repeat request processes; applying the transmit/receive pattern to the at least one half-duplex capable device; and scheduling at least one of transmission and receiving by the at least one half-duplex capable device based on the transmit/receive pattern.

2. The method of claim 1, wherein the at least one uplink subframe comprises at least two consecutive uplink subframes and the at least one downlink subframe comprises at least two consecutive downlink subframes.

3. The method of claim 1, wherein a starting subframe offset is used to position a first subframe within a radio frame.

4. The method of claim 1, wherein the at least one half-duplex capable device comprises a plurality of half-duplex capable devices and wherein defining the at least one transmit/receive pattern comprises defining at least one transmit/receive pattern for each device based at least in part on the device's traffic characteristics and priority.

5. The method of claim 1, wherein the at least one half-duplex capable device comprises a plurality of half-duplex capable devices and wherein defining the at least one transmit/receive pattern comprises defining at least one transmit/receive pattern for each device based at least in part on load balancing based on at least one of expected traffic, resource utilization, and network congestion.

6. The method of claim 5, wherein the load balancing is performed through selection of the starting subframe offset parameter.

7. The method of claim 1, wherein scheduling communication by the at least one device comprises scheduling uplink communication only during the at least one uplink subframe and scheduling downlink communication only during the at least one downlink subframe.

8. The method of claim 1, wherein the scheduling priority of the half duplex device is adjusted to prevent interference with full-duplex devices.

9. The method of claim 8, wherein adjusting the scheduling priority comprises computing a quality of service class identifier weighting.

10. The method of claim 1, wherein at least one preferred transmit/receive pattern is defined based on at least one subframe performance metric, wherein the at least one metric comprises at least one of interference level, signal quality, spectral efficiency, and supportable data rate.

11. A method comprising: configuring a message for transmission to a base station identifying a device as capable of only half-duplex frequency division duplex operation; and receiving at least one downlink subframe eligible to be received by the device, wherein the at least one downlink subframe belongs to a transmit/receive pattern comprising the at least one downlink subframe and at least one uplink subframe, wherein for at least one transmit/receive pattern, the at least one uplink subframe comprises four consecutive uplink subframes and the at least one downlink subframe comprises four consecutive downlink subframes, and wherein, for a device to which the at least one transmit/receive pattern is applied, a check is performed on the last downlink subframe n of a downlink burst to determine if the device has transmitted or received data in subframe n−3 and, if so, the device is prevented from using subframe n−3, wherein the first subframe of the at least one downlink subframe is separated from the first subframe of the at least one uplink subframe only by a predetermined timing offset, wherein the predefined timing offset is based on the maximum number of hybrid automatic repeat request processes.

12. The method of claim 11, wherein a starting subframe offset is used to position a first subframe within a radio frame.

13. The method of claim 11, wherein the at least one uplink subframe comprises at least two consecutive uplink subframes and the at least one downlink subframe comprises at least two consecutive downlink subframes.

14. The method of claim 11, wherein a starting subframe offset is used to position a first subframe within a radio frame.

15. The method of claim 11, wherein the transmit/receive pattern is based at least in part on load balancing based on at least one of expected traffic, resource utilization, and network congestion.

16. The method of claim 15, wherein the load balancing is performed through selection of the starting subframe offset parameter.

17. The method of claim 11, wherein the scheduling information directs uplink communication only during the at least one uplink subframe and downlink communication only during the at least one downlink subframe.

18. An apparatus comprising: at least one processor; memory storing computer program code; wherein the memory storing the computer program code is configured to, with the at least one processor, cause the apparatus to at least: define at least one transmit/receive pattern, wherein the at least one transmit/receive pattern comprises at least one uplink subframe eligible for uplink transmission by at least one half-duplex capable device and at least one downlink subframe eligible for transmission to the at least one half-duplex capable device, wherein for at least one transmit/receive pattern, the at least one uplink subframe comprises four consecutive uplink subframes and the at least one downlink subframe comprises four consecutive downlink subframes, and wherein, for a device to which the at least one transmit/receive pattern is applied, a check is performed on the last downlink subframe n of a downlink burst to determine if the device has transmitted or received data in subframe n−3 and, if so, the device is prevented from using subframe n−3, wherein the first subframe of the at least one uplink subframe and the first subframe of the at least one downlink subframe are separated only by a predefined timing offset, and wherein the predefined timing offset is based on the maximum number of hybrid automatic repeat request processes; apply the transmit/receive pattern to at least one half-duplex capable device; and schedule at least one of transmission and receiving by the at least one half-duplex device based on the transmit/receive pattern.

19. The apparatus of claim 18, wherein the at least one uplink subframe comprises at least two consecutive uplink subframes and the at least one downlink subframe comprises at least two consecutive downlink subframes.

20. An apparatus comprising: at least one processor; memory storing computer program code; wherein the memory storing the computer program code is configured to, with the at least one processor, cause the apparatus to at least: configure a message for transmission to a base station identifying a device as capable of only half-duplex frequency division duplex operation; and receive at least one downlink subframe eligible to be received by the device, wherein the at least one downlink subframe belongs to a transmit/receive pattern comprising the at least one downlink subframe and at least one uplink subframe, wherein for at least one transmit/receive pattern, the at least one uplink subframe comprises four consecutive uplink subframes and the at least one downlink subframe comprises four consecutive downlink subframes, and wherein, for a device to which the at least one transmit/receive pattern is applied, a check is performed on the last downlink subframe n of a downlink burst to determine if the device has transmitted or received data in subframe n−3 and, if so, the device is prevented from using subframe n−3, wherein the first subframe of the at least one downlink subframe is separated from the first subframe of the at least one uplink subframe only by a predetermined timing offset, and wherein the predefined timing offset is based on the maximum number of hybrid automatic repeat request processes.

21. The apparatus of claim 20, wherein the at least one uplink subframe comprises at least two consecutive uplink subframes and the at least one downlink subframe comprises at least two consecutive downlink subframes.

* * * * *